(12) United States Patent
Wu (10) Patent No.: US 12,117,659 B2
(45) Date of Patent: *Oct. 15, 2024

(54) PHOTONIC COUPLER

(71) Applicant: X Development LLC, Mountain View, CA (US)

(72) Inventor: Yi-Kuei Ryan Wu, San Jose, CA (US)

(73) Assignee: X Development LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/107,825

(22) Filed: Feb. 9, 2023

(65) Prior Publication Data

US 2023/0266542 A1 Aug. 24, 2023

Related U.S. Application Data

(63) Continuation of application No. 17/680,004, filed on Feb. 24, 2022, now Pat. No. 11,609,392.

(51) Int. Cl.
*H04B 10/00* (2013.01)
*G02B 6/42* (2006.01)

(52) U.S. Cl.
CPC ......... *G02B 6/4202* (2013.01); *G02B 6/4212* (2013.01); *G02B 6/4284* (2013.01)

(58) Field of Classification Search
CPC ... G02B 6/4202; G02B 6/4212; G02B 6/4284
See application file for complete search history.

(56) References Cited

U.S. PATENT DOCUMENTS 4,362,357 A * 12/1982 Stockmann .......... G02B 6/2808
359/900
5,379,354 A * 1/1995 Jenkins ..................... H01P 1/16
385/27

(Continued)

FOREIGN PATENT DOCUMENTS

EP 2404204 B1 5/2015
WO 2007098506 A2 8/2007

OTHER PUBLICATIONS

Chen et al., Broadband Silicon-on-Insulator directional couplers using a combination of straight and curved waveguide sections, Scientific Reports, Aug. 3, 2017, 8 pages.

(Continued)

*Primary Examiner* — Agustin Bello
(74) *Attorney, Agent, or Firm* — Christensen O'Connor Johnson Kindness PLLC (57) ABSTRACT

A photonic coupler includes an input coupling section, an output coupling section, and a multimode interference (MMI) waveguide section. The input coupling section is adapted to receive an input optical signal along an input waveguide channel. The output coupling section is adapted to output a pair of output optical signals along output waveguide channels. The output optical signals having output optical powers split from the input optical signal. The MMI waveguide section is optically coupled between the input and output coupling sections. Notched waveguide sections may each be disposed between the MMI waveguide section and a corresponding one of the input or output coupling sections and/or the MMI waveguide section may include curvilinear sidewalls.

21 Claims, 6 Drawing Sheets

(56) References Cited

U.S. PATENT DOCUMENTS

| | | | | | |
|---|---|---|---|---|---|
| 5,689,597 | A * | 11/1997 | Besse | G02B 6/2813 | 385/47 |
| 6,047,096 | A * | 4/2000 | Augustsson | G02B 6/12007 | 385/37 |
| 6,236,784 | B1 * | 5/2001 | Ido | G02B 6/2813 | 385/39 |
| 6,571,038 | B1 * | 5/2003 | Joyner | G02B 6/2813 | 385/27 |
| 6,792,172 | B1 * | 9/2004 | Levy | G02B 6/2813 | 385/39 |
| 6,973,232 | B2 * | 12/2005 | Betty | G02B 6/14 | 385/27 |
| 7,035,494 | B1 * | 4/2006 | Mackie | G02B 6/2813 | 398/79 |
| 7,349,628 | B2 * | 3/2008 | Augustsson | G02B 6/12007 | 385/24 |
| 7,734,122 | B1 * | 6/2010 | Mackie | G02B 6/12007 | 385/14 |
| 7,808,618 | B1 * | 10/2010 | Tawney | G01P 15/093 | 356/4.09 |
| 7,856,163 | B2 * | 12/2010 | Saida | G02B 6/1228 | 385/132 |
| 8,743,371 | B2 * | 6/2014 | Langley | G02F 1/225 | 356/477 |
| 8,787,713 | B2 * | 7/2014 | Jeong | G02B 6/2813 | 385/32 |
| 9,097,852 | B2 * | 8/2015 | Koike-Akino | G02B 6/29344 | |
| 9,116,298 | B2 * | 8/2015 | Kojima | G02B 6/2813 | |
| 9,151,894 | B2 * | 10/2015 | Okano | G02B 6/4296 | |
| 9,217,829 | B2 * | 12/2015 | Zhang | G06F 30/23 | |
| 9,557,486 | B2 * | 1/2017 | Ma | G02B 6/2813 | |
| 9,557,624 | B2 * | 1/2017 | Sugiyama | H04B 10/501 | |
| 9,678,288 | B2 * | 6/2017 | Takahashi | G02B 6/29344 | |
| 9,739,947 | B2 * | 8/2017 | Ma | G02B 27/0012 | |
| 9,851,503 | B2 * | 12/2017 | Liu | G02B 6/1228 | |
| 9,946,020 | B1 * | 4/2018 | Horth | G02B 6/124 | |
| 10,036,853 | B1 * | 7/2018 | Lin | G02B 6/12007 | |
| 10,048,443 | B2 * | 8/2018 | Ma | G02B 6/4225 | |
| 10,254,480 | B2 * | 4/2019 | Takahashi | G02B 6/125 | |
| 10,620,370 | B2 * | 4/2020 | Shinohara | G02B 6/12 | |
| 10,862,610 | B1 * | 12/2020 | Schubert | G06F 30/367 | |
| 10,935,726 | B1 * | 3/2021 | Lee | G02F 1/3136 | |
| 11,086,149 | B2 * | 8/2021 | Iwatsuka | G02F 1/225 | |
| 11,187,854 | B2 * | 11/2021 | Schubert | G06F 30/23 | |
| 11,256,030 | B1 * | 2/2022 | Chandran | G02B 6/1225 | |
| 11,280,960 | B2 * | 3/2022 | Qi | G02F 1/3137 | |
| 11,280,961 | B1 * | 3/2022 | Hammond | G02B 6/125 | |
| 11,327,232 | B2 * | 5/2022 | Hasegawa | G02B 6/126 | |
| 11,467,341 | B2 * | 10/2022 | Bian | G02B 6/2813 | |
| 11,609,392 | B1 * | 3/2023 | Wu | G02B 6/2813 | |
| 2002/0150318 | A1 * | 10/2002 | Shekel | G02B 27/0087 | 385/11 |
| 2003/0035609 | A1 * | 2/2003 | Hatanaka | G02B 6/122 | 385/27 |
| 2003/0113063 | A1 * | 6/2003 | Liu | G02B 6/2813 | 359/333 |
| 2006/0039646 | A1 * | 2/2006 | Nashimoto | G02F 1/3137 | 385/39 |
| 2006/0115200 | A1 * | 6/2006 | Van Der Vliet | G02B 6/125 | 385/12 |
| 2006/0204175 | A1 * | 9/2006 | Laurent-Lund | G02B 6/305 | 385/129 |
| 2006/0278960 | A1 * | 12/2006 | Hida | G02B 6/125 | 257/664 |
| 2008/0019632 | A1 * | 1/2008 | Ishii | G02F 1/225 | 385/2 |
| 2008/0260322 | A1 * | 10/2008 | Thapliya | G02B 6/2813 | 385/9 |
| 2010/0166427 | A1 * | 7/2010 | Jeong | H04B 10/65 | 398/82 |
| 2011/0129236 | A1 * | 6/2011 | Jeong | G02B 6/26 | 385/3 |
| 2011/0158574 | A1 * | 6/2011 | Jeong | G02B 6/2813 | 385/2 |
| 2012/0002921 | A1 * | 1/2012 | Jeong | G02B 6/125 | 385/32 |
| 2012/0002924 | A1 * | 1/2012 | Okayama | G02B 6/125 | 385/46 |
| 2013/0234698 | A1 * | 9/2013 | Dorner | G01R 15/246 | 324/96 |
| 2014/0086595 | A1 * | 3/2014 | Yamazaki | G02B 6/125 | 156/280 |
| 2014/0178005 | A1 * | 6/2014 | Zhang | G06F 30/394 | 385/45 |
| 2014/0325827 | A1 * | 11/2014 | Lipson | G02B 6/125 | 29/592 |
| 2015/0036964 | A1 * | 2/2015 | Okano | G02B 6/125 | 385/14 |
| 2015/0043867 | A1 * | 2/2015 | Kono | G02F 1/025 | 438/31 |
| 2015/0117867 | A1 * | 4/2015 | Sugiyama | G02F 1/0316 | 398/182 |
| 2016/0377814 | A1 * | 12/2016 | Ma | G02B 6/125 | 385/24 |
| 2017/0167899 | A1 * | 6/2017 | Amezcua-Correa | G01D 5/35351 | |
| 2018/0164506 | A1 * | 6/2018 | Painchaud | G02B 6/2813 | |
| 2018/0172913 | A1 * | 6/2018 | Lin | G02B 6/2726 | |
| 2018/0373114 | A1 * | 12/2018 | Tanaka | G02B 6/2813 | |
| 2020/0003619 | A1 * | 1/2020 | Hu | G01N 21/65 | |
| 2020/0011795 | A1 * | 1/2020 | Schmidt | G01N 21/645 | |
| 2020/0033692 | A1 * | 1/2020 | Katou | G02F 1/3137 | |
| 2020/0052467 | A1 * | 2/2020 | Wu | H01S 5/06 | |
| 2020/0124707 | A1 * | 4/2020 | Lopez | G01S 7/484 | |
| 2021/0018603 | A1 * | 1/2021 | Lu | G01S 17/32 | |
| 2022/0171251 | A1 * | 6/2022 | Saito | G02F 1/212 | |
| 2022/0229316 | A1 * | 7/2022 | Cohen | G02F 1/011 | |
| 2022/0317372 | A1 * | 10/2022 | Cai | G02B 6/12007 | |
| 2023/0266542 | A1 * | 8/2023 | Wu | G02B 6/4212 | 385/88 |

OTHER PUBLICATIONS

Cherchi et al., Unconstrained splitting ratios in compact double-MMI couplers, Optics Express vol. 22, No. 8, Apr. 21, 2014, 9 pages.

Chiu et al., The Critical Adiabatic Linear Tapered Waveguide Combined with a Multimode Waveguide Coupler on an SOI Chip, International Journal of Optics, vol. 2019, Nov. 11, 2019, 11 pages.

Latunde-Dada et al., An Optimal Design strategy for MMI Splitters, published prior to Feb. 23, 2022, 3 pages.

Multi Mode Interferometers, published prior to Feb. 23, 2022, 2 pages.

Solehmainen et al., Adiabatic and Multimode Interference Couplers on Silicon-on-Insulator, IEEE Photonics Technology Letters, vol. 18, No. 21, Nov. 1, 2006, 5 pages.

Tseng et al., Variable splitting ratio 2x2 MMI couplers using multimode waveguide holograms, Optics Express, vol. 15, No. 14, Jul. 9, 2007, 7 pages.

International Search Report and Written Opinion of the International Searching Authority, mailed Apr. 14, 2023, in corresponding International Patent Application No. PCT/US2022/051524, 9 pages.

* cited by examiner

PHOTONIC COUPLER

CROSS-REFERENCE TO RELATED APPLICATIONS

This application is a continuation application of U.S. patent application Ser. No. 17/680,004, filed Feb. 24, 2022, the contents of which are hereby incorporated by reference.

TECHNICAL FIELD

This disclosure relates generally to photonic devices, and in particular but not exclusively, relates to photonic splitters.

BACKGROUND INFORMATION

A photonic splitter is a device that splits the optical power of an input optical signal into multiple output optical signals in a predictable manner. A beam splitter is an example of a basic photonic splitter that relies upon a partially transmissive/reflective interface layer (e.g., a refractive boundary, multilayer dichroic films, etc.). A more sophisticated example of a photonic splitter is a multimode interferometer or multimode interference (MMI) coupler. MMI couplers have gained popularity due to their versatility as power splitters, interferometers, optical switches, etc.

Figure 1:
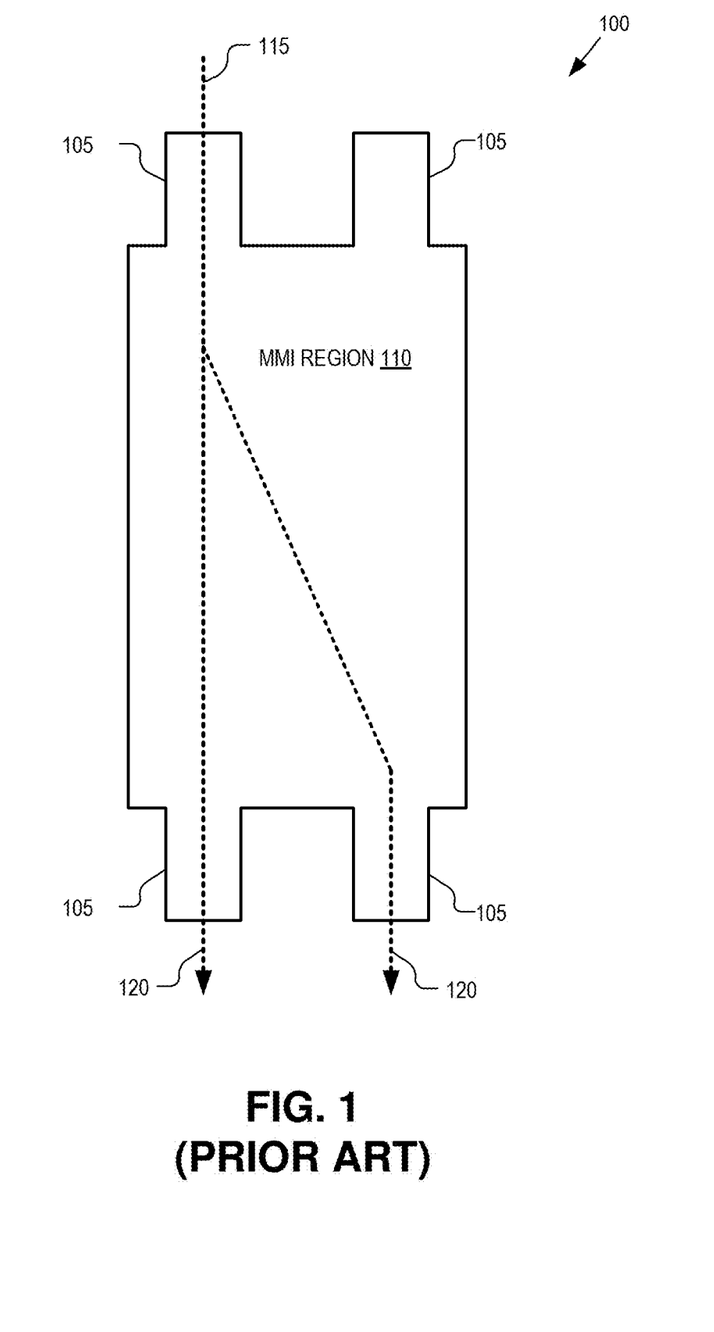
FIG. 1 (PRIOR ART) is a block diagram illustrating a conventional 2×2 optical splitter.

FIG. 1 illustrates a conventional 2×2 MMI coupler 100 that includes two pairs of coupling waveguide ports 105 connected via a MMI region 110. The optical power of the input optical signal 115 is split between two output ports 105 due to modal dispersion and constructive/destructive interference between the fundamental and higher order modes of propagation (multimode beating) within MMI region 110. Conventional MMI couplers have rectilinear MMI regions and do not in practice provide lossless 50/50 power splitting. In fact, MMI couplers are particularly susceptible to fabrication variances, which lead to lossy, power split imbalances. Conventional techniques apply adiabatic design principles to MMI region 110 to improve splitting uniformity and reduce losses. However, these adiabatic design principles typically include lengthening MMI region 110 to provide adequate distance for the multimode interference to occur while maintaining the rectilinear shape. This leads to a larger overall device and still may not achieve the desired performance specifications (e.g., splitting imbalance, power loss) over a desired range of operating wavelengths.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of a system, apparatus, and method of operation for photonic couplers/splitters having reduced wavelength sensitivities, improved power balance, and reduced power loss are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of the photonic coupler described herein provide reduced wavelength sensitives, improved power balance, and/or reduced power loss all within a compact form factor. It is believed these benefits/characteristics are achieved using structural design features that help phase match the modal dispersion occurring in the multimode interference (MMI) waveguide section over a shorter distance than achieved with conventional rectilinear MMI couplers, such as 2×2 MMI coupler 100.

Figure 2A:
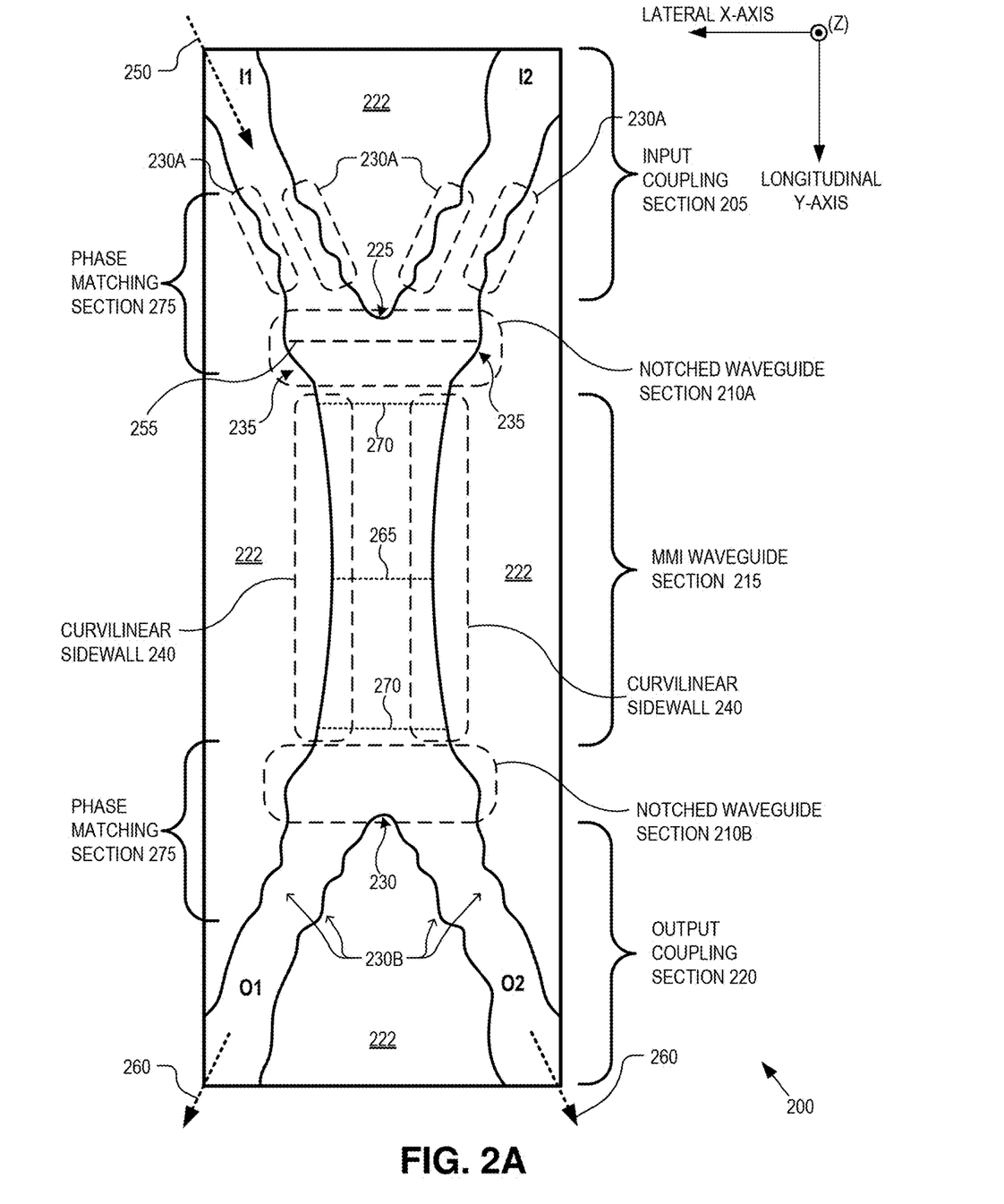
FIG. 2A is a schematic diagram of a photonic coupler with several optimizing features that reduce wavelength sensitivity and increase power split balance in a compact form factor, in accordance with an embodiment of the disclosure.

FIG. 2A is a schematic diagram of a photonic coupler 200 with several optimizing features that reduce wavelength sensitivity, increase power split balance, and reduce overall power loss, in accordance with an embodiment of the disclosure. Photonic coupler 200 is a 2×2 coupler, which may be operated as a splitter (1×2 coupler) or a combiner (2×1 coupler) dependent upon which of its waveguide channels are stimulated with optical power. Photonic coupler 200 is described in relation to its operation as a photonic splitter; however, it should be appreciated that photonic coupler 200 may be operated in reverse to split optical power in a reverse direction or function as a photonic combiner in an interferometer.

The illustrated embodiment of photonic coupler 200 includes an input coupling section 205, notched waveguide sections 210A and 210B (collectively 210), a MMI waveguide section 215, an output coupling section 220, and cladding material 222. The illustrated embodiment of input coupling section 205 includes a pair of input waveguide channels I1 and I2 that meet at a juncture 225 and sidewall corrugations 230A. The illustrated embodiment of output coupling section 220 includes a pair of output waveguide channels O1 and O2 that start/meet at a juncture 230 and sidewall corrugations 230B. Notched waveguide sections 210 each include sidewall notches 235. The illustrated embodiment of MMI waveguide section 215 includes curvilinear sidewalls 240.

Photonic coupler 200 may be fabricated in a variety of materials and form factors. In one embodiment, photonic coupler 200 is fabricated as a planar waveguide structure disposed within a semiconductor material. The waveguiding channels (e.g., input waveguide channels I1 and I2, output waveguide channels O1 and O2, notched waveguide sections 210, and MMI waveguide section 215) are fabricated of a higher refractive index core material than the surrounding cladding material 222. For example, the waveguiding channels may be fabricated of silicon while cladding material 222 is silicon dioxide. Other example materials include Silicon Nitride (Si3N4), Gallium Arsenide (GaAs), Indium Gallium Arsenide (InGaAs), other III-V semiconductor materials, or otherwise. Other non-semiconductor materials may also be used. In one embodiment, photonic coupler 200 is a photonic integrated circuit (PIC) disposed as a planar waveguide in a silicon-on-insulator (SOI) device. Semiconductor manufacturing processes are well suited for fabricating photonic coupler 200 due to its compact form factor and small feature sizes (e.g., micron level dimensions). A demonstrative implementation of photonic coupler 200 may have a lateral dimensions of 2.4 um (X-axis) by 1.55 to 2.2 um (Z-axis) and a longitudinal dimension (Y-axis) of 6 um. Of course, other dimensions, fabrication techniques, and component materials may be used.

Input coupling section 205 is adapted to receive an input optical signal 250 at its input waveguide channel I1 (or I2). The input waveguide channels are single mode waveguides at their inputs, but facilitate inter-channel evanescent coupling as the input waveguide channels converge towards juncture 225. This evanescent coupling serves to laterally expand the input signal across photonic coupler 200 and excite the higher order modes with power from the fundamental mode as the optical signal propagates towards MMI waveguide section 215.

Notched waveguide sections 210 are disposed between MMI waveguide section 215 and either input coupling section 205 or output coupling section 220. Notched waveguide section 210A includes a pair of sidewall notches 235 arranged in an opposing configuration (e.g., facing laterally across from each other). The opposing sidewall notches 235 expand and contract a lateral cross-section 255 (e.g., in the lateral X-axis) of notched waveguide section 210A as the optical signal moves down photonic coupler 200 along the longitudinal Y-axis. Sidewall notches 235 may be viewed as outward protrusions or dimples in the waveguide sidewall (high index to low index interface/boundary). This brief expansion then contraction of lateral cross-section 255 serves a phase matching function between the fundamental mode and the higher order modes that are forming/exciting in the vicinity of juncture 225. In other words, the fundamental mode of propagation is temporarily slowed relative to the first higher order mode of propagation encouraging efficient modal phase matching for improved optical power splitting between the laterally offset output waveguide channels O1 and O2.

In addition to opposing sidewall notches 235, input waveguide channels I1 and I2 and output waveguide channels O1 and O2 may also include sidewall corrugations 230A and 230B, respectively. Sidewall corrugations 230 include opposing pairs of sidewall corrugations on each waveguide channel. The corrugations may be implemented as notches, wavey sections, contour perturbations, etc. Sidewall corrugations 230 appear to provide a phase matching function to also offset the effects of modal dispersion between the fundamental mode and the first order higher mode. However, the effect provided by sidewall corrugations 230 is smaller relative to notched waveguide sections 210. Collectively, notched waveguide sections 210 and sidewall corrugations 230 are referred to as phase matching sections 275. In the illustrated embodiment, photonic coupler 200 is symmetrical about its X and Y axes and thus capable of reversible operation (splitter regardless of which waveguide channel is stimulated). In other embodiments, the phase matching sections 275 may be individually optimized for unidirectional operation.

The manufacturability of juncture 225 is a consideration when designing photonic coupler 200. The gap (e.g., arc radius) introduced by juncture 225 (or 230) is affected by the minimum feature size of a given fabrication process. The size of juncture 225 illustrated in FIG. 2A is merely demonstrative and may affect the feature size and contour details of sidewall notches 235 as well as sidewall corrugations 230. Inverse design principles may be used to refine or optimize the topological contours and/or feature sizes of the corrugations and notches.

When the optical wavefronts enter MMI waveguide section 215, the high order propagation mode has been excited thereby facilitating MMI beating (i.e., constructive and destructive interference) along the longitudinal length of MMI waveguide section 215, which is a driver of power splitting between output optical signals 260 at output waveguide channels O1 and O2. Wavelength sensitivity is further reduced using curvilinear sidewalls 240 along the longitudinal length of MMI waveguide section 215 to compensate for modal dispersion. Curvilinear sidewalls 240 arc inward towards a central region of MMI waveguide section 215. In other words, a lateral cross-section 265 at a longitudinal center of MMI waveguide section 215 is narrower than lateral cross-sections 270 at longitudinal peripheries of MMI waveguide section 215. MMI waveguide section 215 has a narrow waistline which tapers gradually using curvilinear geometries (e.g., smooth, uninterrupted curvatures). In one embodiment, lateral cross-section 265 is 0.16 um narrower than lateral cross-sections 270 while MMI waveguide section 215 is approximately 1.9 um long. Of course, these dimensions are demonstrative and material dependent.

Notched waveguide section 210B and output coupling section 220 operate in much the same way that input coupling section 205 and notched waveguide section 210A do, but in reverse. In various embodiments, photonic coupler 200 is symmetrical about its X-axis, Y-axis, and/or about both the X and Y axes. In a fully symmetrical embodiment, the characterization of a given longitudinal end as being input versus output may be entirely arbitrary. In other embodiments, one or more features may be adjusted resulting in an asymmetrical design with definite input and output sides.

Similar to the corrugations and notches described above, inverse design principles may be applied to design, refine or optimize any or all of the topological shapes, contours (including the curvatures of curvilinear sidewalls 240), or feature sizes of photonic coupler 200. For example, an inverse design simulator (aka design model) may be configured with an initial design such as 2×2 MMI coupler 100, or an initial design of photonic coupler 200, to perform a forward operational simulation of the initial design (e.g., using Maxwell's equations for electromagnetics). The output of the forward operational simulation is a simulated field response at output coupling section 220. Specific performance parameters of this output field response may be selected as parameters of interest (e.g., power loss, power imbalance, etc.) and are referred to as simulated performance parameters. The simulated performance parameters are used by a performance loss function to calculate a performance loss value, which may be a scalar value (e.g., mean square difference between simulated performance values and target performance values). The differentiable nature of the design model enables a backpropagation via an adjoint simulation of a performance loss error, which is the difference between the simulated output values and the desired/target performance values. The performance loss error (e.g., loss gradients) is backpropagated through the design model during the adjoint simulation to generate a structural design error at input coupling section 205. Backpropagation of the performance loss error facilitates the computation of additional performance gradients, such as structural gradients that represent the sensitivity of the performance loss value to changes in the structural material properties (e.g., topology, material types, etc.) of photonics coupler 200. These gradients are output as a structural design error, which may then be used by a structural optimizer to perform an iterative gradient descent (e.g., stochastic gradient descent) that optimizes or refines the initial structural design to generate a revised structural design. The forward and reverse simulations may then be iterated until the performance loss value falls within acceptable design criteria. The above description is merely an example inverse design technique that may be used to refine or optimize the features and topology of photonic coupler 200. It is appreciated that other inverse design techniques alone, or in combination with other conventional design techniques, may also be implemented.

Figure 2B:
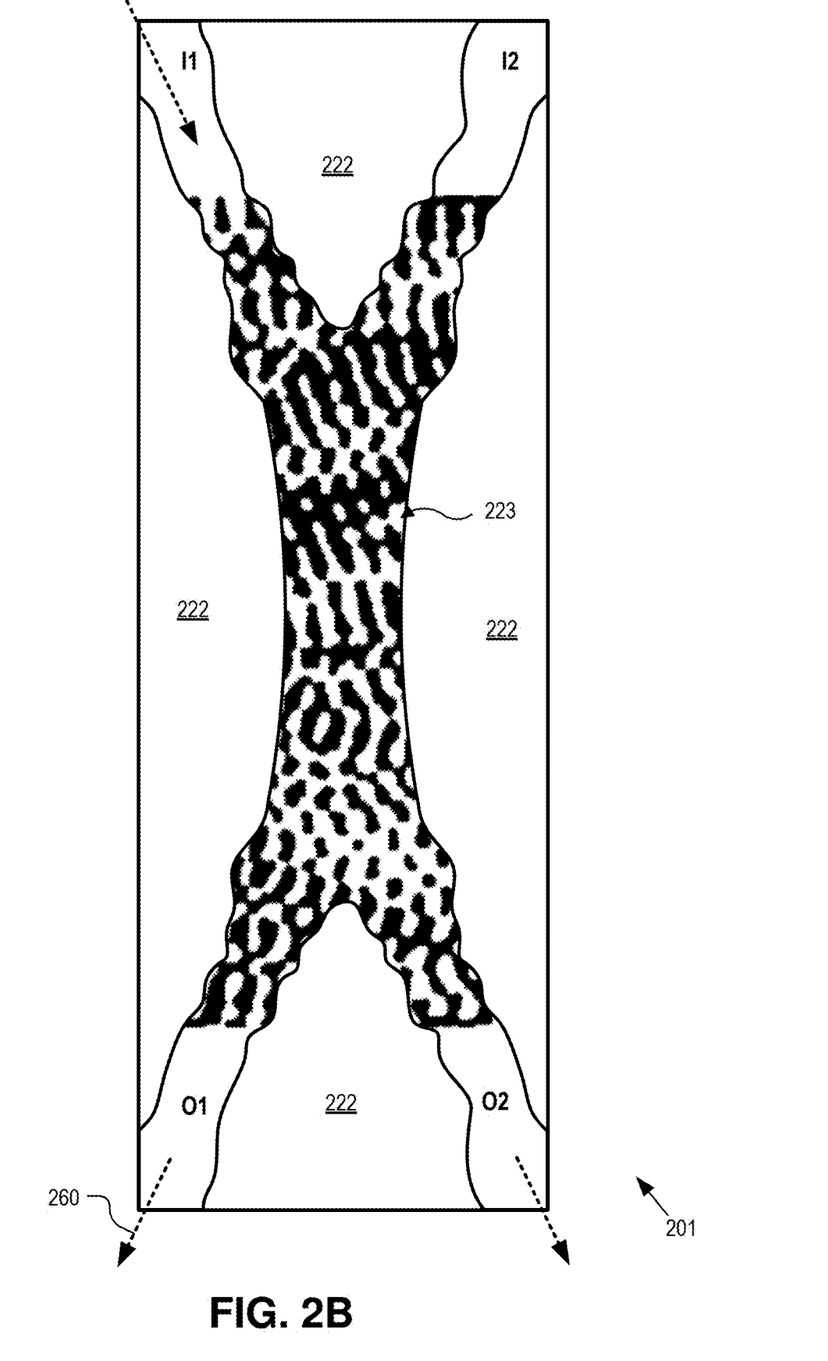
FIG. 2B is a schematic diagram of a photonic coupler with inhomogeneous dispersive core material filling one or more of the waveguide sections, in accordance with an embodiment of the disclosure.

FIG. 2B is a schematic diagram of a photonic coupler 201 with inhomogeneous dispersive core material 223 filling one or more of the waveguide sections, in accordance with an embodiment of the disclosure. Photonic coupler 201 is similar to photonic coupler 200 except the dispersive core material 223 may include an inhomogeneous mixture of two or more materials having differing refractive indexes. For example, dispersive core material 223 may include an inhomogeneous arrangement of silicon and silicon oxide features, an inhomogeneous arrangement of differently doped semiconductor material, or otherwise. The inhomogeneous dispersive core material 223 may include an arrangement or pattern of different refractive material features/portions that collectively help phase matching between the fundamental and higher order modes of propagation (e.g., spatially targeted slowing of one mode compared to the other). In other words, the specific beating pattern between the fundamental and higher order modes may be beneficially adjusted by the inhomogeneous dispersive core material 223. In some embodiments, inhomogeneous dispersive core material 223 may be arranged to further reduce power split imbalances across a wider range of wavelengths. The inverse design techniques described above may be applied to determine the specific material combinations, feature sizes, and feature arrangement (i.e., pattern) to achieve the desired phase matching function via appropriate selection of the performance loss function and target performance values.

Figure 3:
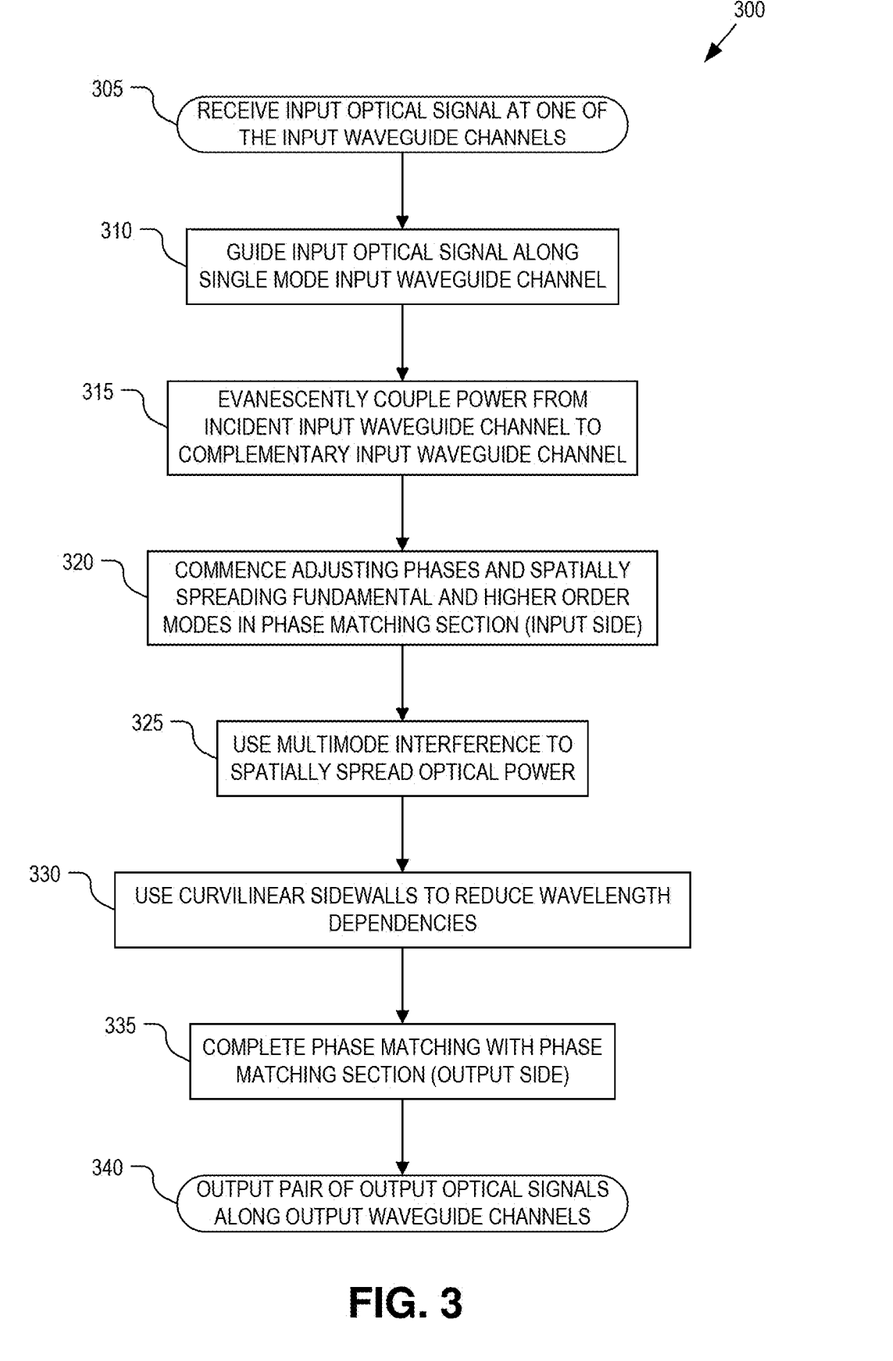
FIG. 3 is a flow chart illustrating operation of the photonic coupler as a splitter, in accordance with an embodiment of the disclosure.

FIG. 3 is a flow chart illustrating a process 300 for operation of photonic coupler 200, in accordance with an embodiment of the disclosure. Process 300 describes an optical splitter function of photonic coupler 200; however, it should be appreciated that photonic coupler 200 may also operate in reverse as an optical combiner or reverse direction splitter. The order in which some or all of the process blocks appear in process 300 should not be deemed limiting. Rather, one of ordinary skill in the art having the benefit of the present disclosure will understand that some of the process blocks may be executed in a variety of orders not illustrated, or even in parallel.

In a process block 305, input optical signal 250 is received at input waveguide channel I1. Of course, process 300 is equally applicable for an input optical signal received at input waveguide channel I2. Input waveguide channel I1 is a single mode waveguide configured to receive input optical signal 250 as a single mode signal and guide input optical signal 250 toward notched waveguide section 210A and MMI waveguide section 215 (process block 310).

As input optical signal 250 propagates along input waveguide channel I1, it begins to evanescently couple power across cladding material 222 proximate to juncture 225 into the complementary/adjacent input waveguide channel I2 (process block 315). This evanescent coupling is the beginning of spatially spreading the optical power of input optical signal 250 laterally across photonic coupler 200. While doing so, higher order modes of propagation begin to be excited as input optical signal 250 approaches notched waveguide section 210A. With the appearance of a higher order mode, modal dispersion between the fundamental mode and the first higher order mode also begins to occur. The modal dispersion detrimentally spreads the optical power in the longitudinal spatial direction. Accordingly, in a process block 320, sidewall corrugations 230A are placed along the sidewalls of input sidewall channels I1 and I2 to introduce phase compensation to help match the phases between the fundamental and higher order propagation modes. The influence of sidewall corrugations 230A on modal phase matching is believed to be relatively small compared to the contributions provided by notched waveguide section 210A. Some embodiments of optical coupler 200 may even omit sidewall corrugations 230. When present, both sidewall corrugations 230A and notched waveguide section 210A may collectively influence the relative phase between the fundamental and higher order modes to improve phase matching. In the illustrated embodiment, sidewall notches 235 in notched waveguide section 210A and sidewall corrugations 230A produce widening and narrowing waveguide sections (i.e., expansion and contraction in the lateral cross-section of the respective waveguide section/channel). In the illustrated embodiment, the input waveguide channels include a series of small notches that produce a series of small expansions and contractions while notched waveguide section 210A includes a single pair of sidewall notches 235 producing a single larger expansion and contraction.

Figure 4:
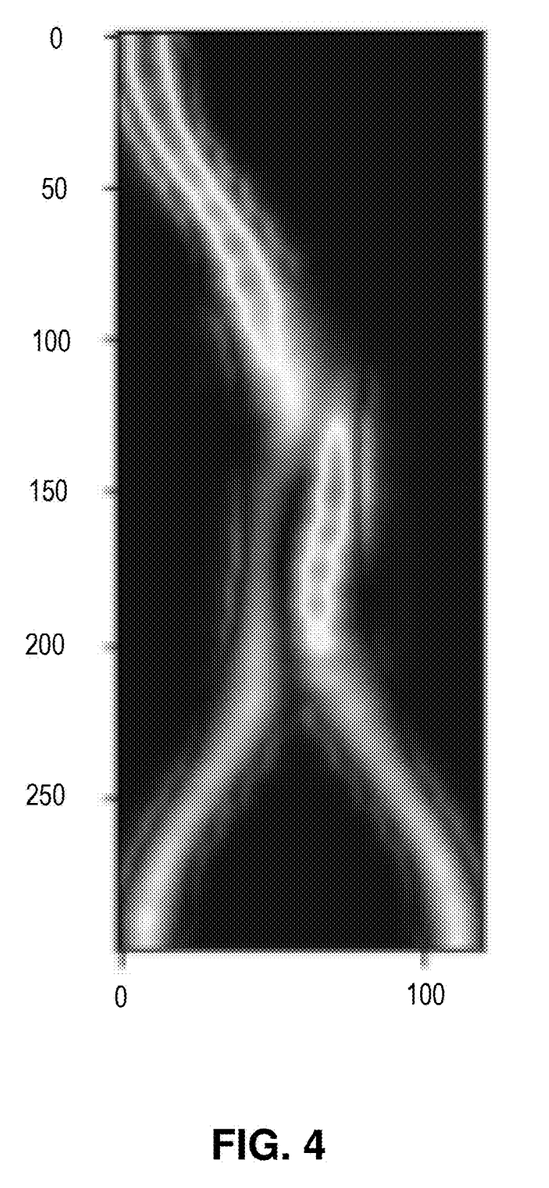
FIG. 4 is a heat map illustrating the power distribution/splitting within the photonic coupler, in accordance with an embodiment of the disclosure.

After notched waveguide section 210A, the optical signal enters MMI waveguide section 215 where multimode interference beating occurs (process block 325). The beating serves, at least in part, to spatially spread the optical power laterally (X-axis) across the MMI waveguide section 215 in preparation of splitting the optical power into two substantially equal output optical signals O1 and O2 at the longitudinal opposite end of MMI waveguide section 215. FIG. 4 is a heat map illustrating the power distribution and substantially equal power splitting within photonic coupler 200.

Figure 5A:
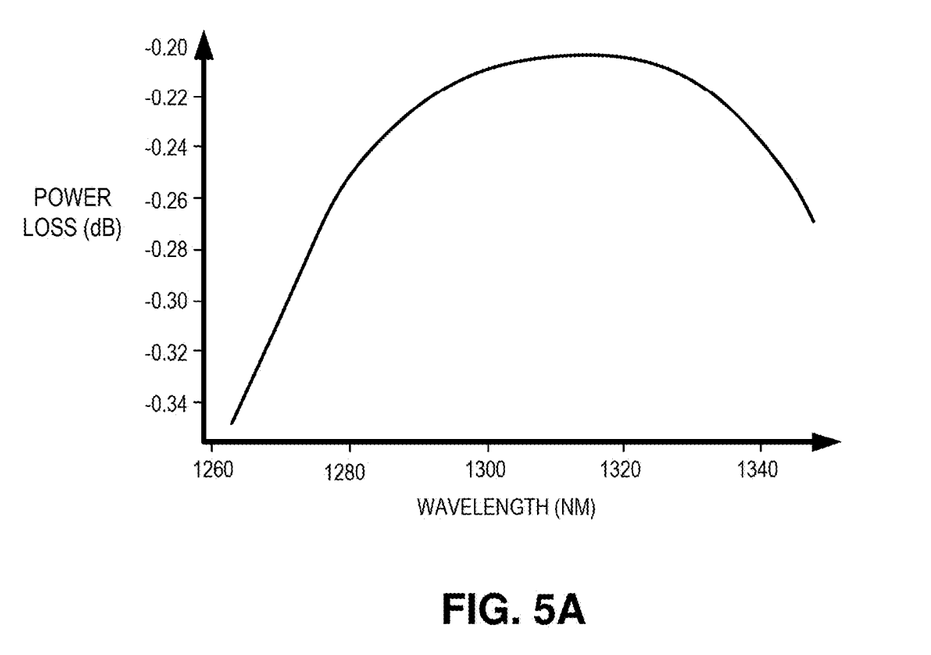
FIG. 5A is a plot illustrating power loss sensitivity versus wavelength of the photonic coupler, in accordance with an embodiment of the disclosure.
Figure 5B:
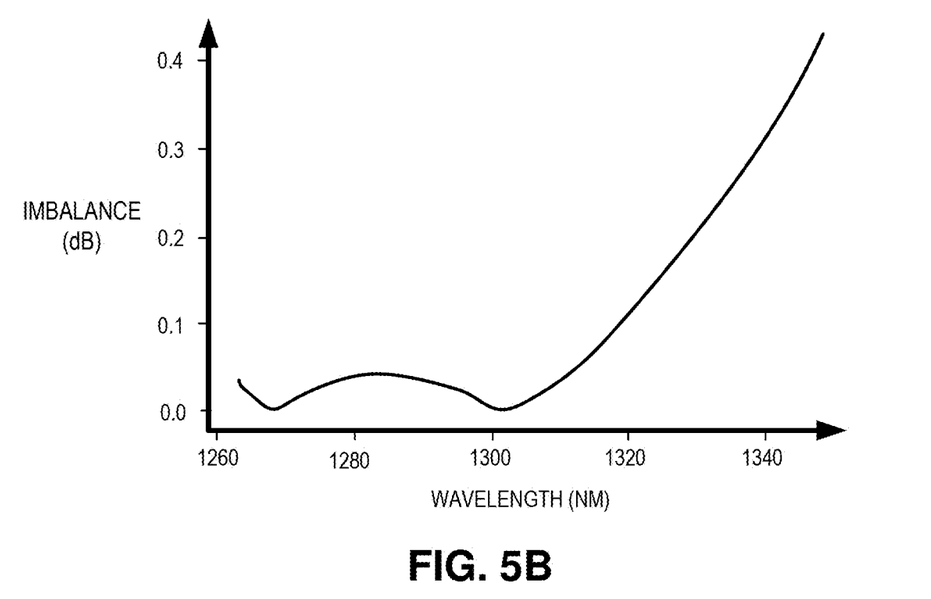
FIG. 5B is a plot illustrating power imbalance versus wavelength of the photonic coupler, in accordance with an embodiment of the disclosure.

Referring to FIG. 2A, MMI waveguide section 215 also includes curvilinear sidewalls 240. In the illustrated embodiment, curvilinear sidewalls 250 arc inward towards a central region of MMI waveguide section 215. In other words, lateral cross-section 265 in the middle of MMI waveguide section 215 is narrower than lateral cross-sections 270 near the peripheries of MMI waveguide section 215. The non-constant lateral width of MMI waveguide section 215 reduces the wavelength sensitivity by compensating the mode dispersion. FIG. 5A is a plot illustrating the relatively low power loss ranging between 0.2 to 0.34 dB across the 1260 nm to 1340 nm wavelengths. FIG. 5B is a plot illustrating the relatively low power splitting imbalance of photonic coupler 200 between the 1260 nm to 1310 nm wavelengths for input optical signal 250. The curvilinear sidewalls 240 reduce wavelength dependencies in MMI waveguide section 215 (process block 330) in the MMI beating.

Returning to FIG. 3, output coupling section 220 operates in a similar manner as the input coupling section 205. Notched waveguide section 210B and corrugated sidewalls 230B again serve to phase match the fundamental and higher order propagation modes (process block 335) as the optical power is transitioned back into the fundamental mode along output waveguide channels O1 and O2. In process block 340, the output optical signals 260 are split into substantially equal power halves (e.g., see FIG. 5B) and output as single mode signals from output waveguide channels O1 and O2 (process block 340).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A photonic combiner, comprising:
   an input coupling section adapted to receive input optical signals along input waveguide channels;
   an output coupling section adapted to output an output optical signal along an output waveguide channel, the output optical signal having an output optical power from combining the input optical signals;
   a multimode interference (MMI) waveguide section optically coupled between the input and output coupling sections; and
   notched waveguide sections including a first notched waveguide section disposed between the MMI waveguide section and the input coupling section and a second notched waveguide section disposed between the MMI waveguide section and the output coupling section, wherein the notched waveguide sections each including a pair of opposing sidewall notches that expands and contracts a lateral cross-section of a corresponding one of the notched waveguide sections along a longitudinal axis of the photonic combiner.

2. The photonic combiner of claim 1, wherein the photonic combiner comprises a 2×2 photonic combiner having a pair of output waveguide channels including the output waveguide channel.

3. The photonic combiner of claim 2, wherein the notched waveguide sections are each disposed proximate to a juncture of either the input waveguide channels or the output waveguide channels.

4. The photonic combiner of claim 1, wherein the MMI waveguide section includes curvilinear sidewalls each having a smooth uninterrupted curvature extending between the notched waveguide sections.

5. The photonic combiner of claim 4, wherein the curvilinear sidewalls arc inwards towards a central region of the MMI waveguide section forming a smooth and gradual narrowing of the MMI waveguide at the central region.

6. The photonic combiner of claim 4, wherein a lateral cross-section of the MMI waveguide section is narrower at a longitudinal center of the MMI waveguide section than longitudinal peripheries of the MMI waveguide section.

7. The photonic combiner of claim 1, further comprising:
   sidewall corrugations disposed along the input waveguide channels and the output waveguide channel.

8. The photonic combiner of claim 7, wherein the sidewall corrugations comprise opposing pairs of sidewall corrugations on each of the input waveguide channels and the output waveguide channel.

9. The photonic combiner of claim 1, wherein the photonic combiner comprises a planar waveguide disposed within a semiconductor material surrounded by semiconductor oxide material.

10. The photonic combiner of claim 1, wherein the input waveguide channels and the output waveguide channel are single mode waveguides.

11. The photonic combiner of claim 1, wherein the MMI waveguide section and the notched waveguide sections are symmetrical about a lateral axis passing through a center of the MMI waveguide section.

12. A photonic coupler, comprising:
    an input coupling section adapted to receive input optical signals along input waveguide channels;
    an output coupling section adapted to output an output optical signal along an output waveguide channel, the output optical signal having an output optical power from combining the input optical signals; and
    a multimode interference (MMI) waveguide section optically coupled between the input and output coupling sections, wherein the MMI waveguide section includes curvilinear sidewalls that arc inwards towards a central region of the MMI waveguide section, wherein the curvilinear sidewalls of the MMI waveguide section each have a single smooth uninterrupted curvature that extends an entire length of the MMI waveguide section.

13. The photonic coupler of claim 12, wherein the photonic coupler comprises a 2×2 photonic coupler having a pair of output waveguide channels including the output waveguide channel.

14. The photonic coupler of claim 13, further comprising:
    notched waveguide sections each disposed between the MMI waveguide section and a corresponding one of the input or output coupling sections, the notched waveguide sections each including a pair of opposing sidewall notches that expands and contracts a lateral cross-section of a corresponding one of the notched waveguide sections along a longitudinal axis of the photonic coupler.

15. The photonic coupler of claim 14, wherein the notched waveguide sections are each disposed proximate to a juncture of either the input waveguide channels or the output waveguide channels.

16. The photonic coupler of claim 14, wherein at least one of the MMI waveguide section or the notched waveguide section includes an inhomogeneous dispersive core material having a pattern selected for adjusting a modal phase between a fundamental mode of propagation and a higher order mode of propagation.

17. The photonic coupler of claim 14, wherein the single smooth uninterrupted curvature extends between the notched waveguide sections.

18. The photonic coupler of claim 12, further comprising:
   sidewall corrugations disposed along the input waveguide channels and the output waveguide channel.

19. The photonic coupler of claim 18, wherein the sidewall corrugations comprise opposing pairs of sidewall corrugations on each of the input waveguide channels and the output waveguide channel.

20. The photonic coupler of claim 12, wherein the curvilinear sidewalls arc inwards towards the central region of the MMI waveguide section forming a smooth and gradual narrowing of the MMI waveguide at the central region.

21. The photonic coupler of claim 14, wherein the single smooth uninterrupted curvature extends from a first notched waveguide section adjacent to the input coupling section to a second notched waveguide section adjacent to the output coupling section.

* * * * *